(12) United States Patent
Dunkel et al.

(10) Patent No.: US 8,363,109 B2
(45) Date of Patent: Jan. 29, 2013

(54) VIDEO PROCESSING SYSTEM PROVIDING ENHANCED TRACKING FEATURES FOR MOVING OBJECTS OUTSIDE OF A VIEWABLE WINDOW AND RELATED METHODS

(75) Inventors: Christopher T. Dunkel, Palm Bay, FL (US); Tariq Bakir, Melbourne, FL (US); Robert McDonald, Palm Bay, FL (US); John Heminghous, Melbourne, FL (US); Aric Peterson, Palm Bay, FL (US)

(73) Assignee: Harris Corporation, Melbourne, FL (US)

(*) Notice: Subject to any disclaimer, the term of this patent is extended or adjusted under 35 U.S.C. 154(b) by 505 days.

(21) Appl. No.: 12/634,843

(22) Filed: Dec. 10, 2009

(65) Prior Publication Data

US 2011/0141287 A1    Jun. 16, 2011

(51) Int. Cl.
*H04N 5/225* (2006.01)
*H04N 7/18* (2006.01)

(52) U.S. Cl. ........................ 348/169; 348/143

(58) Field of Classification Search .......... 348/148–169; 382/103
See application file for complete search history.

(56) References Cited

U.S. PATENT DOCUMENTS

| | | | |
|---|---|---|---|
| 5,600,775 A | 2/1997 | King et al. .................... 395/806 |
| 5,625,715 A | 4/1997 | Trew et al. .................... 382/236 |
| 5,936,552 A | 8/1999 | Wichgers et al. ............. 340/963 |
| 6,173,317 B1 | 1/2001 | Chaddha et al. .............. 709/219 |
| 6,327,533 B1 | 12/2001 | Chou ............................ 701/207 |
| 6,363,320 B1 | 3/2002 | Chou ............................ 701/207 |
| 6,392,661 B1 | 5/2002 | Tankersley .................... 345/660 |
| 6,597,818 B2 | 7/2003 | Kumar et al. .................. 382/294 |
| 6,609,005 B1 | 8/2003 | Chern ............................ 455/457 |
| 7,559,017 B2 | 7/2009 | Datar et al. .................... 715/230 |
| 2006/0041375 A1 | 2/2006 | Witmer et al. ................ 701/208 |
| 2007/0191029 A1 | 8/2007 | Zarem et al. .............. 455/456.5 |
| 2008/0074494 A1 | 3/2008 | Nemethy et al. .............. 348/143 |
| 2008/0130951 A1* | 6/2008 | Wren et al. .................... 382/103 |
| 2008/0140311 A1 | 6/2008 | Searight et al. ............... 701/208 |
| 2009/0028439 A1* | 1/2009 | Elangovan et al. ........... 382/209 |

FOREIGN PATENT DOCUMENTS

| | | |
|---|---|---|
| WO | 2005/031382 | 4/2005 |
| WO | 2005/120071 | 12/2005 |
| WO | 2007/095526 | 8/2007 |
| WO | 2009/085233 | 7/2009 |

\* cited by examiner

*Primary Examiner* — Wing F Chan
*Assistant Examiner* — David X Yi
(74) *Attorney, Agent, or Firm* — Allen, Dyer, Doppelt, Milbrath & Gilchrist, P.A.

(57) ABSTRACT

A video processing system may include a display and a video processor coupled to the display. The video processor may be configured to display a georeferenced video feed on the display defining a viewable area, determine actual geospatial location data for a selected moving object within the viewable area, and generate estimated geospatial location data along a predicted path for the moving object when the moving object is no longer within the viewable area and based upon the actual geospatial location data. The video processor may be further configured to define a successively expanding search area for the moving object when the moving object is no longer within the viewable window and based upon the estimated geospatial location data, and search within the successively expanding search area for the moving object when the successively expanding search area is within the viewable area.

17 Claims, 19 Drawing Sheets

VIDEO PROCESSING SYSTEM PROVIDING ENHANCED TRACKING FEATURES FOR MOVING OBJECTS OUTSIDE OF A VIEWABLE WINDOW AND RELATED METHODS

FIELD OF THE INVENTION

The present invention relates to the field of video processing, and, more particularly, to processing of geospatially referenced video and related methods.

BACKGROUND OF THE INVENTION

Enhancements in video imaging, data storage capabilities, and satellite location technology have lead to the relatively widespread use of georeferenced video in numerous applications such as recognizance, surveillance, surveying, and the like. Generally speaking, georeferenced video includes video imagery frames encapsulated in a transport stream along with geospatial metadata that correlates the pixel space of the imagery to geospatial coordinate values (e.g., latitude/longitude coordinates).

Given the large amounts of georeferenced video data that can be generated and stored with technology, it can become difficult to communicate the video and associated metadata to users in a relatively straightforward and intuitive way. Various approaches are used to communicate video-related information to users. One approach is set forth in U.S. Pat. No. 7,559,017 to Datar et al., which discloses a system for transferring annotations associated with a media file. An annotation associated with a media file is indexed to a first instance of that media file. By comparing features of the two instances, a mapping is created between the first instance of the media file and a second instance of the media file. The annotation can be indexed to the second instance using the mapping between the first and second instances. The annotation can be processed (displayed, stored, or modified) based on the index to the second instance.

Another potential difficulty with georeferenced video is how to provide desired situational awareness. Various approaches for improving situational awareness have been developed. One example is set forth in U.S. Pat. No. 6,392,661, which discloses an apparatus for arranging and presenting situational awareness information on a computer display screen using maps and/or other situational awareness information, so that greater amounts of relevant information can be presented to a user within the confines of the viewable area on small computer screen displays. The map display layout for a screen display utilizes multiple, independent map displays arranged on a computer screen to maximize situational awareness information and display that information efficiently. The apparatus provides the ability to independently scale with respect to distance, time and velocity, as well as zoom and pan each map on the screen display.

Another problem which may be encountered with sensor data providing georeferenced video is that position accuracy may vary from one sensor type to the next. One approach for addressing inaccurate geospatial images through the use of image registration, i.e., where newly captured images are compared with reference images with known accurate coordinates to provide a basis for correcting the newly captured image geospatial metadata. In accordance with one exemplary approach, U.S. Pat. No. 6,957,818 to Kumar et al. discloses a system for accurately mapping between image coordinates and geo-coordinates, called geo-spatial registration. The system utilizes the imagery and terrain information contained in a geo-spatial database to align geodetically calibrated reference imagery with an input image, e.g., dynamically generated video images, and thus achieve a high accuracy identification of locations within the scene. When a sensor, such as a video camera, images a scene contained in the geo-spatial database, the system recalls a reference image pertaining to the imaged scene. This reference image is aligned with the sensor's images using a parametric transformation. Thereafter, other information that is associated with the reference image can be overlaid upon or otherwise associated with the sensor imagery.

Tracking objects within georeferenced video feeds is also a desirable feature that may be problematic in some circumstances. One particularly advantageous system in this regard is the Full-Motion Video Asset Management Engine (FAME™) from the present Assignee Harris Corporation. The FAME™ system speeds the process of analyzing a wide range of intelligence information. For geospatial analysis, the FAME™ system has a mapping interface that provides a visual display for the sensor track and location of frames of video from an unmanned aerial vehicle (UAV) or other source. This tool allows indexing, search, retrieval, and sensor tracking in real time during play out. Further exploitation of geospatial metadata is done by extracting embedded Key-Length-Value (KLV) metadata from the video stream.

Despite the advantages of such approaches, further functionality may be desirable for processing and displaying georeferenced video feeds.

SUMMARY OF THE INVENTION

In view of the foregoing background, it is therefore an object of the present invention to provide a system and related methods for enhanced processing of georeferenced video feeds and related methods.

This and other objects, features, and advantages are provided by a video processing system which may include a display and a video processor coupled to the display. More particularly, the video processor may be configured to display a georeferenced video feed on the display defining a viewable area, determine actual geospatial location data for a selected moving object within the viewable area, and generate estimated geospatial location data along a predicted path for the moving object when the moving object is no longer within the viewable area and based upon the actual geospatial location data. The video processor may be further configured to define a successively expanding search area for the moving object when the moving object is no longer within the viewable window and based upon the estimated geospatial location data, and search within the successively expanding search area for the moving object when the successively expanding search area is within the viewable area. As such, the video processor may relatively quickly re-acquire a moving object after it exits and re-enters the viewable area, after panning away from and back to the object, etc., to thereby provide enhanced tracking and/or monitoring of objects within georeferenced video feeds.

The video processor may be further configured to overlay a tracking indicator for the moving object within the viewable area. Moreover, the video processor may also be configured to overlay an annotation indicator for the moving object within the viewable area. The video processor may further be configured to discontinue generating the estimated geospatial location data based upon a threshold.

The video processing system may further include a geospatial database for storing the actual geospatial location data. Additionally, the viewable area may be defined by a first set of boundary pixels, and the video processor may be further configured to define the successively expanding search area by a second set of boundary pixels. By way of example, the video processor may be configured to generate the estimated geolocation data further based upon a velocity model. More particularly, the velocity model may account for elevation, earth curvature, etc. Also by way of example, the video feed may be from a video camera.

A related video processing method may include displaying a georeferenced video feed on the display defining a viewable area, determining actual geospatial location data for a selected moving object within the viewable area, and generating estimated geospatial location data along a predicted path for the moving object when the moving object is no longer within the viewable area and based upon the actual geospatial location data. The method may further include defining a successively expanding search area for the moving object when the moving object is no longer within the viewable window and based upon the estimated geospatial location data, and searching within the successively expanding search area for the moving object when the successively expanding search area is within the viewable area.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
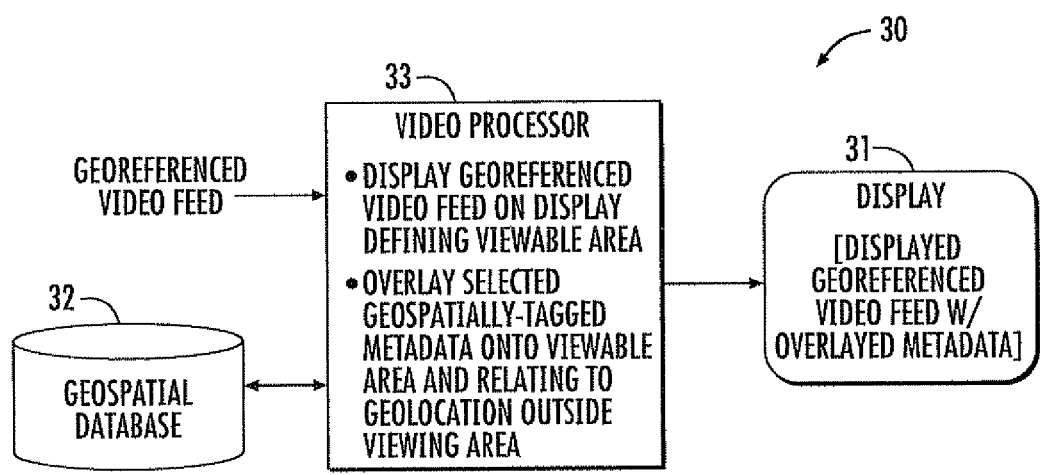
FIG. 1 is a schematic block diagram of a video processing system in accordance with one aspect of the invention providing overlayed geospatially-tagged metadata onto a viewable display area and relating to a geolocation outside of the viewable area.
Figure 4:
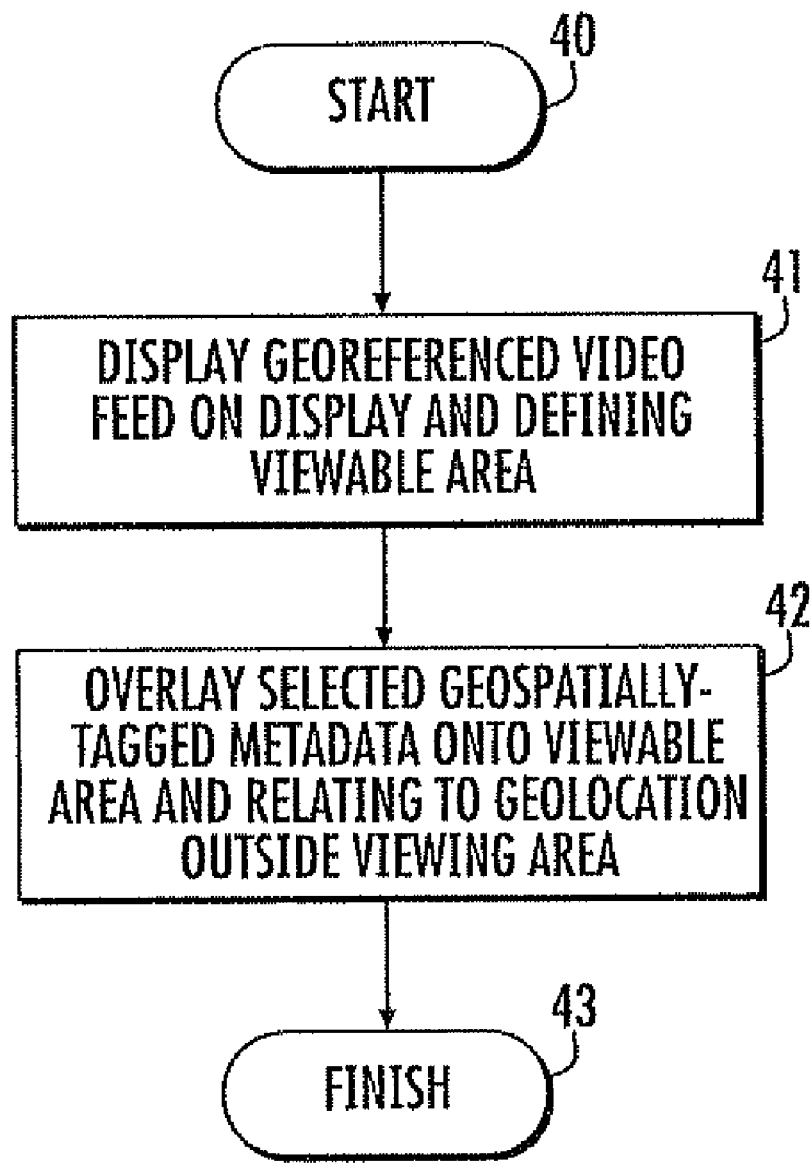
FIGS. 4 and 5 are flow diagrams illustrating video processing method aspects associated with the systems of FIGS. 1 and 2.

Referring initially to FIGS. 1 and 4, a video processing system 30 and associated method aspects are first described. The system 30 illustratively includes a display 31, one or more geospatial databases 32, and a video processor 33. By way of example, the video processors described herein and the various functions that they perform, may be implemented using a combination of computer hardware (e.g., microprocessor(s), memory, etc.) and software modules including computer-executable instructions, as will be appreciated by those skilled in the art. Similarly, the geospatial database(s) 32 may be implemented using a suitable storage device(s) (i.e., memory) and a database server application to be run on a computing platform and including computer-executable instructions for performing the various data storage and retrieval operations described herein, a will also be appreciated by those skilled in the art.

As noted above, situational awareness in video can be difficult to achieve using prior art approaches. With the ever-larger amounts of georeferenced video data being generated, intuitive approaches for communicating geospatial metadata information associated with the georeferenced videos to the viewer are desirable. Otherwise, rapid analysis of geospatial information, which may be required in certain applications, may prove difficult.

While existing satellite positioning technology (e.g., GPS units) allow for some degree of situational awareness, this is typically not the case in a video environment. In the above-noted FAME™ system, video and metadata from multiple sources may be viewed by many different people, and situational awareness is accomplished through the referencing of external applications or area maps, such as Google™ Earth, for example. While annotations may be added to video by users, those annotations typically cannot be referenced from other videos or visualization tools.

The system 30 advantageously provides a unified approach to manage geospatially tagged metadata, user-defined features, and points of interest, which may be implemented in a video platform such as the FAME™ system, for example, although the present invention may be used with other suitable systems as well. That is, the system 30 may advantageously be used for a video-centric environment to apply reverse geocoding techniques to increase real-time situational awareness in video.

Figure 2:
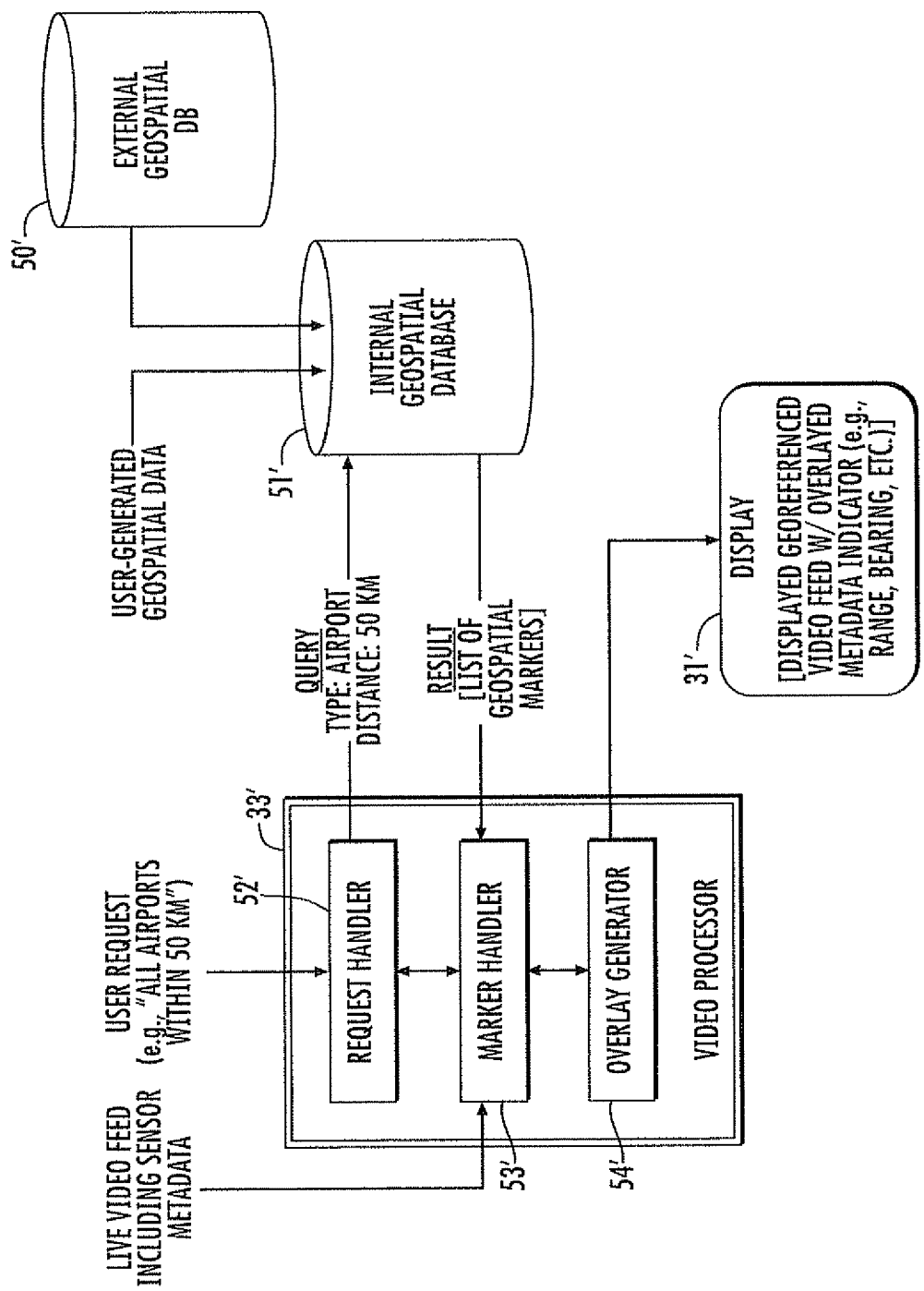
FIG. 2 is a schematic block diagram of an alternative embodiment of the video processing system of FIG. 1.
Figure 3:
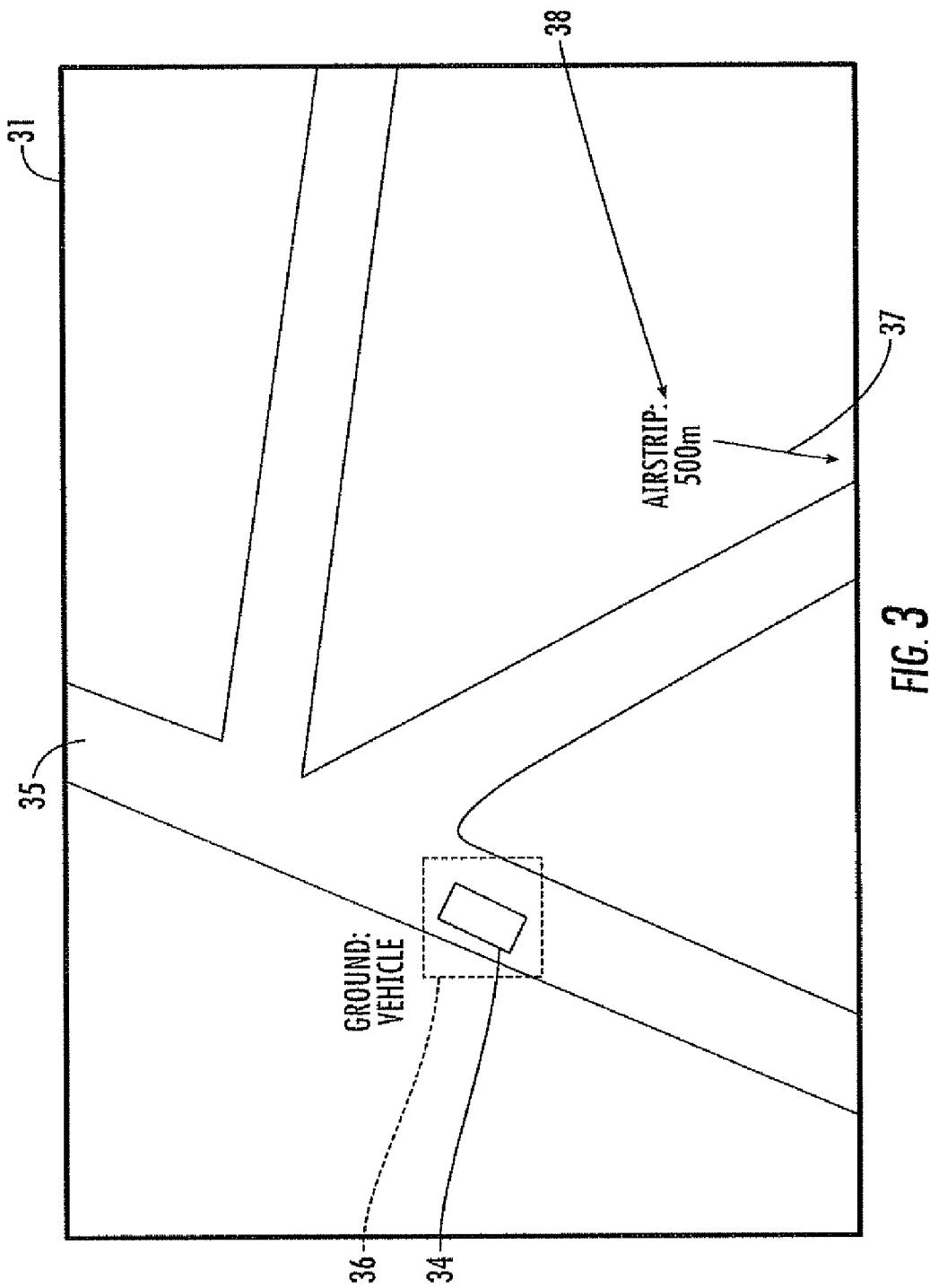
FIG. 3 is view of the display of the system of FIG. 1 showing an aerial image with overlayed geospatially-tagged metadata.

In particular, the video processor 33 cooperates with the display 31 and the database 32 and is configured to display a georeferenced video feed on the display and defining a viewable area, at Blocks 40-41. Referring additionally to the example in FIG. 3, and to FIG. 2, an aerial view of a vehicle 34 being tracked by a video sensor as it travels along a road 35 is shown, which defines a viewable area (i.e., what can be seen on the display 31). An object highlight box 36 and accompanying annotation ("Ground: Vehicle") indicates to the viewer or operator that the object is being tracked, and what the object is, although such indicators are not required in all embodiments. To provide enhanced situational awareness, the video processor 33 advantageously overlays selected geospatially-tagged metadata onto the viewable area and relating to a geolocation outside the viewable area, at Block 42, thus concluding the illustrated method (Block 43).

In the illustrated example, two such indicators are included, namely a bearing indicator (i.e., arrow) 37 indicating a bearing to the selected geospatial location outside the viewable area, as well as a range indicator 38 indicating a range thereto ("Airstrip: 500 m"). By way of example, the distance may be measured between a current frame center (as determined from sensor metadata) and the desired feature location obtained from the internal geospatial database 51'. The bearing angle may be measured between true north and line connecting the current frame center and the selected feature, for example.

Figure 5:
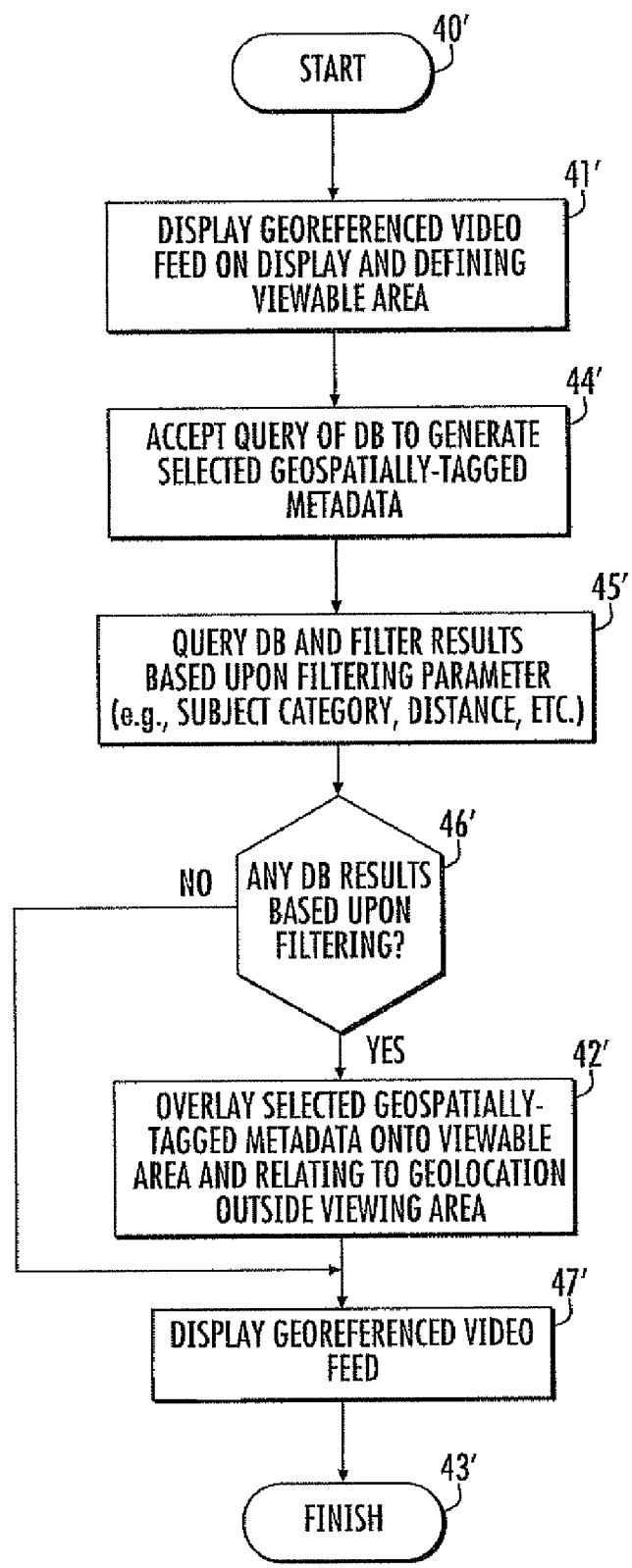
Figure 6:
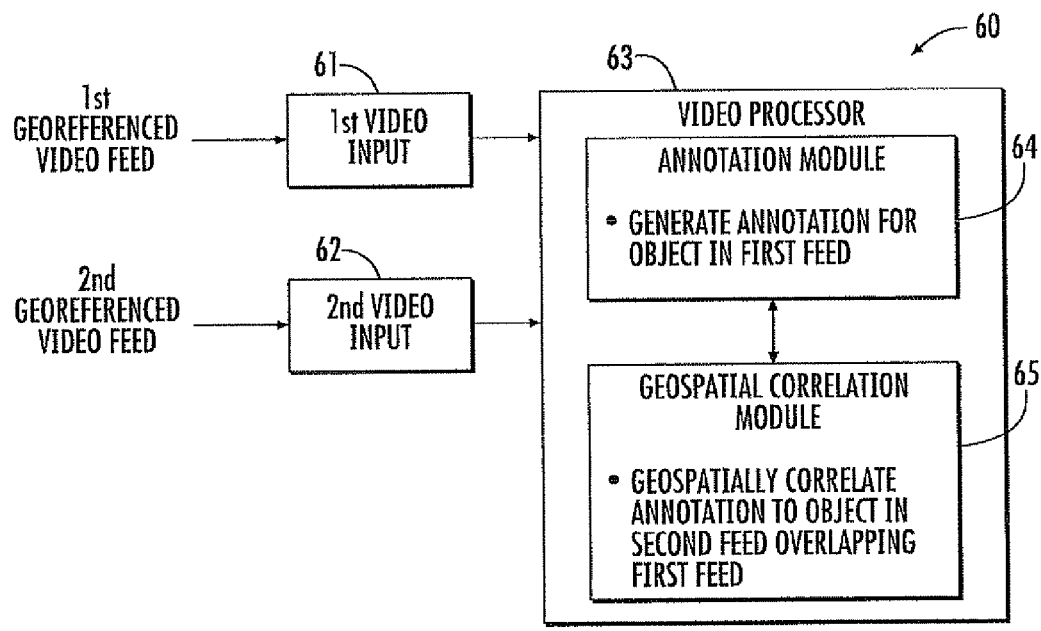
FIG. 6 is a schematic block diagram of a video processing system in accordance with another aspect of the invention providing geospatial correlation of annotations to an object in overlapping geospatial video feeds.

By way of example, the selected geospatially-tagged metadata may comprise at least one of geospatially referenced feature annotations, geospatially referenced video source locations, and geospatially referenced points of interest. Turning additionally to FIG. 5, annotations/metadata may be provided by an external geospatial database 50', such as a commercial off-the-shelf (COTS) database including geospatial points of interest, etc., as well as through user input (i.e., user-generated geospatial data). The external and user-generated geospatial data may be stored in a common internal geospatial database 51' for convenience of access by the video processor 33' in the illustrated example, but the geospatial metadata may be distributed among multiple databases or sources in other embodiments. The database 51' stores the respective geospatial features along with their absolute latitude and longitude, as will be appreciated by those skilled in the art.

The external geospatial database 50' may be conceptually viewed as a fixed or static set of geospatial data, even though such commercially available data sets may be customized or modified in some embodiments, and the user-generated geospatial data may be considered as variable data that may be readily changed by users. That is, the system 30' advantageously provides for reverse geocoding with both static and user-defined geospatial features on a video-centric platform.

In particular, the video processor 33' illustratively includes a request handler 52' configured to accept a query or request from a user. The query is communicated to the geospatial database 51' to generate selected geospatially-tagged metadata that satisfies the given query (i.e., filtering) parameters, at Blocks 44'-45'. The query may be based upon one or more filtering parameters, which in the present example includes a category filtering parameter (i.e., airports), and a distance filtering parameter (i.e., within 50 km). By way of example, the category filtering parameters may include categories such as buildings, landmarks (e.g., airports or airfields, etc.), natural formations (e.g., rivers, mountains, etc.), vehicles, etc.

The video processor 33' further illustratively includes a marker handler 53' which is configured to overlay the selected geospatially-tagged metadata obtained from the database 51', if any (Block 46'), onto the viewable area. The video processor 33' also illustratively includes an overlay generator 54' for overlaying the appropriate annotation(s) on the video feed displayed on the display 31' as described above. This advantageously allows the video to be viewed by the user as normal, while at the same time providing ready access to information for off-screen or out of view features of interest, including names, locations, and any other relevant information stored in the database 51'. Other information, such as population, size, speed, priority level, etc., may also be included in the database 51' and handled by the marker handler 53'. Location information for mobile or moving off-screen objects may be provided by a secondary tracking system, e.g., a secondary user viewing station with a separate video interfaced to the system 31', as will be appreciated by those skilled in the art.

Exemplary applications for the systems 30, 30' may include applications such as surveillance, planning, or reconnaissance where it is desirable to remain aware of objects or features which are out of frame. Moreover, the systems 30, 30' may also advantageously be used for location-based services and advertising, as will be appreciated by those skilled in the art.

Turning additionally to FIGS. 6-10, another video processing system 60 and associated method aspects are now described. In certain applications where multiple geospatial video feeds are used at the same time, it may be desirable to correlate geospatial metadata across the various video data sets. That is, as imagery/video detectors or sensors become more ubiquitous, there is a need to translate geospatial metadata between the different sensor feeds. By way of example, such applications may include government, emergency services, and broadcast industry applications. In the government sector, annotation standards and tools to accommodate those standards are in current development. In the commercial sector, telestration tools are in use, but are typically limited to visual annotation of still frames.

Generally speaking, the system 60 advantageously allows for transferring visual annotations between disparate sensors. Extracted metadata may be utilized to spatially correlate sensor perspectives. In real-time, annotations may be projected onto an alternative georeferenced video feed, whether temporal or non-temporal in nature. Moreover, annotations may be transferred onto temporal data which overlaps spatially within a user-defined offset, and annotations may also be transferred onto spatially overlapping non-temporal data.

More particularly, the video processing system 60 illustratively includes a first video input 61 configured to receive a first georeferenced video feed from a first video source, and a second video input 62 configured to receive a second georeferenced video feed from a second video source, which overlaps the first video georeferenced video feed, at Block 90-91, as will be discussed further below. The system 30 further illustratively includes a video processor 63 coupled to the first and second video inputs 61, 62. The video processor 63 further illustratively includes an annotation module 64 configured to generate an annotation for an object in the first georeferenced video feed, at Block 92. The video processor 63 also illustratively includes a geospatial correlation module 64 configured to geospatially correlate the annotation to the object in the second georeferenced video feed overlapping the first georeferenced video feed, at Block 93, thus concluding the method illustrated in FIG. 9 (Block 94). Accordingly, the video processing system 60 advantageously allows annotations made in one perspective to be translated to other perspectives, and thus provides tracking abilities and correlation of objects between different georeferenced video feeds.

Figure 7:
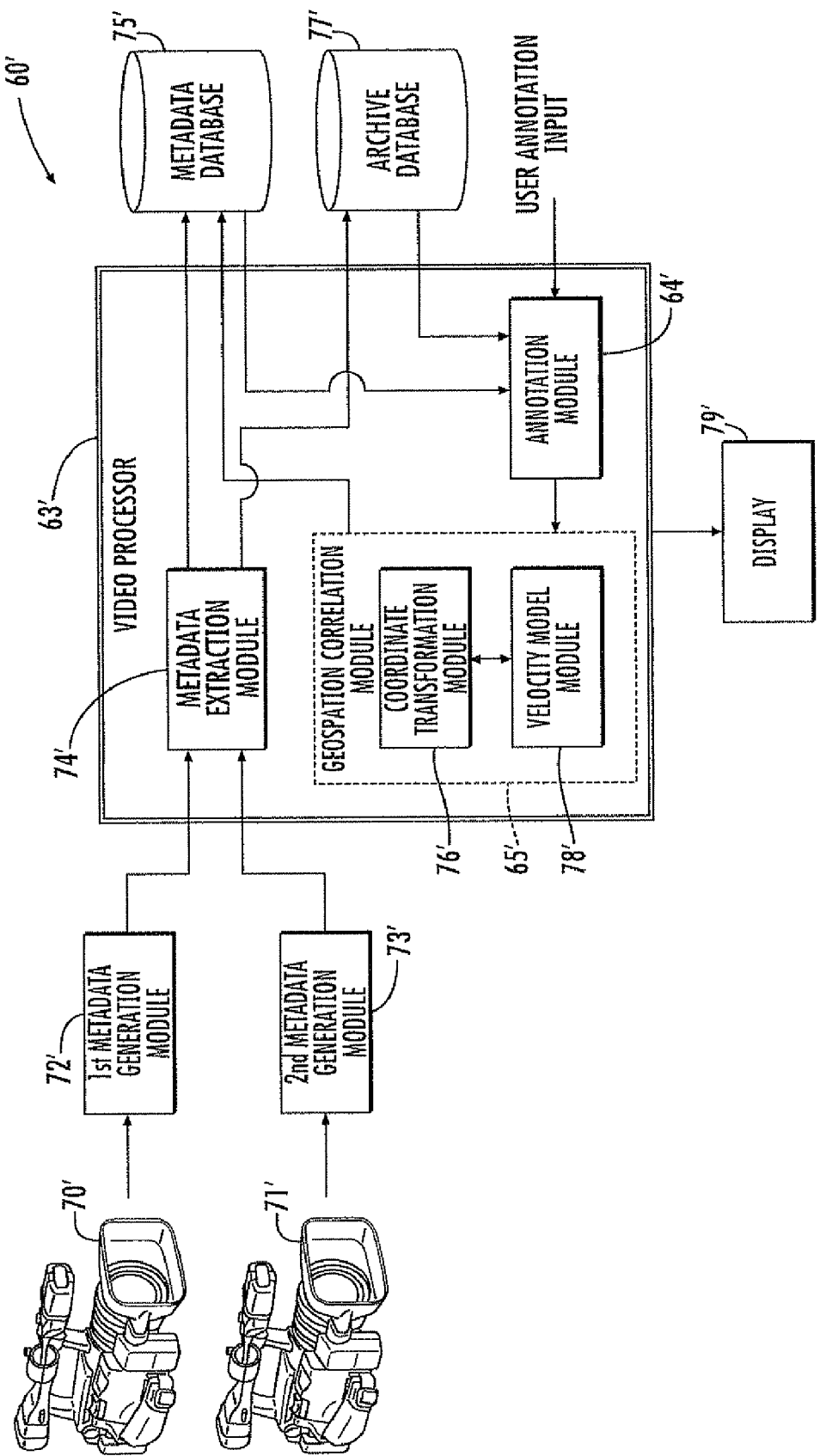
FIG. 7 is schematic block diagram of an alternative embodiment of the video processing system of FIG. 6.
Figure 8B:
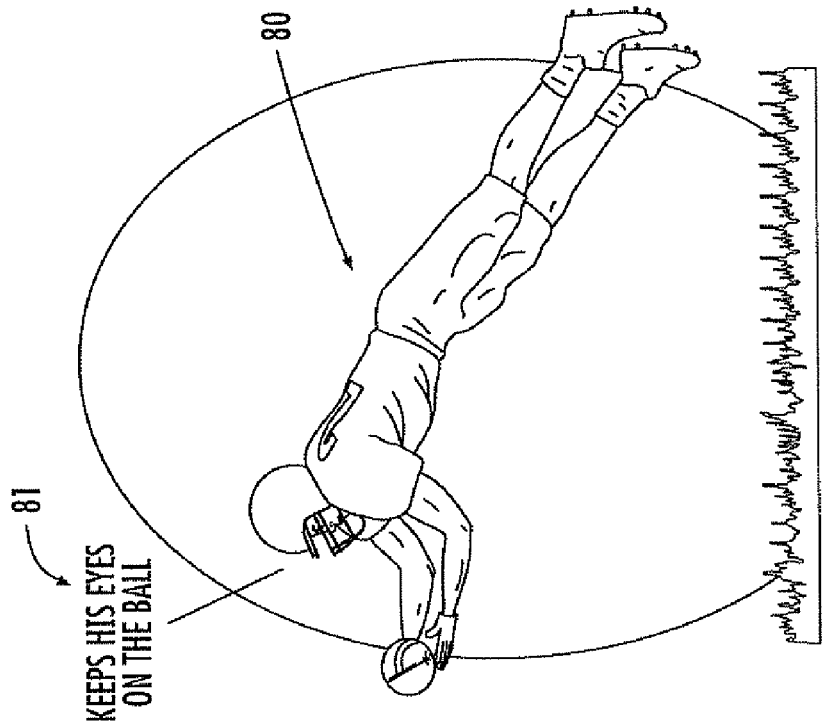
FIGS. 8A and 8B are respective frame views of overlapping geospatial video feeds taken from different vantage points and showing correlation of an annotation to an object from the first feed to the second feed.
Figure 8A:
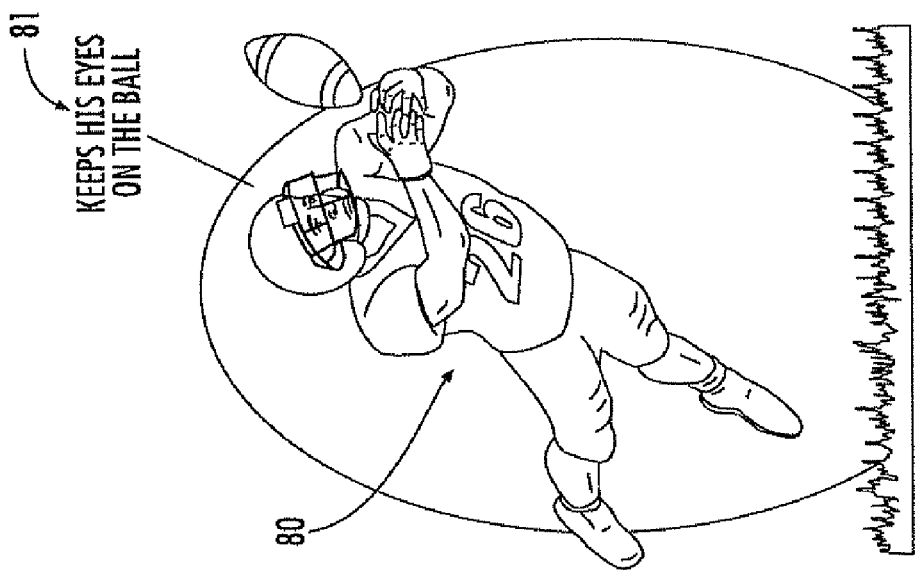
Figure 9:
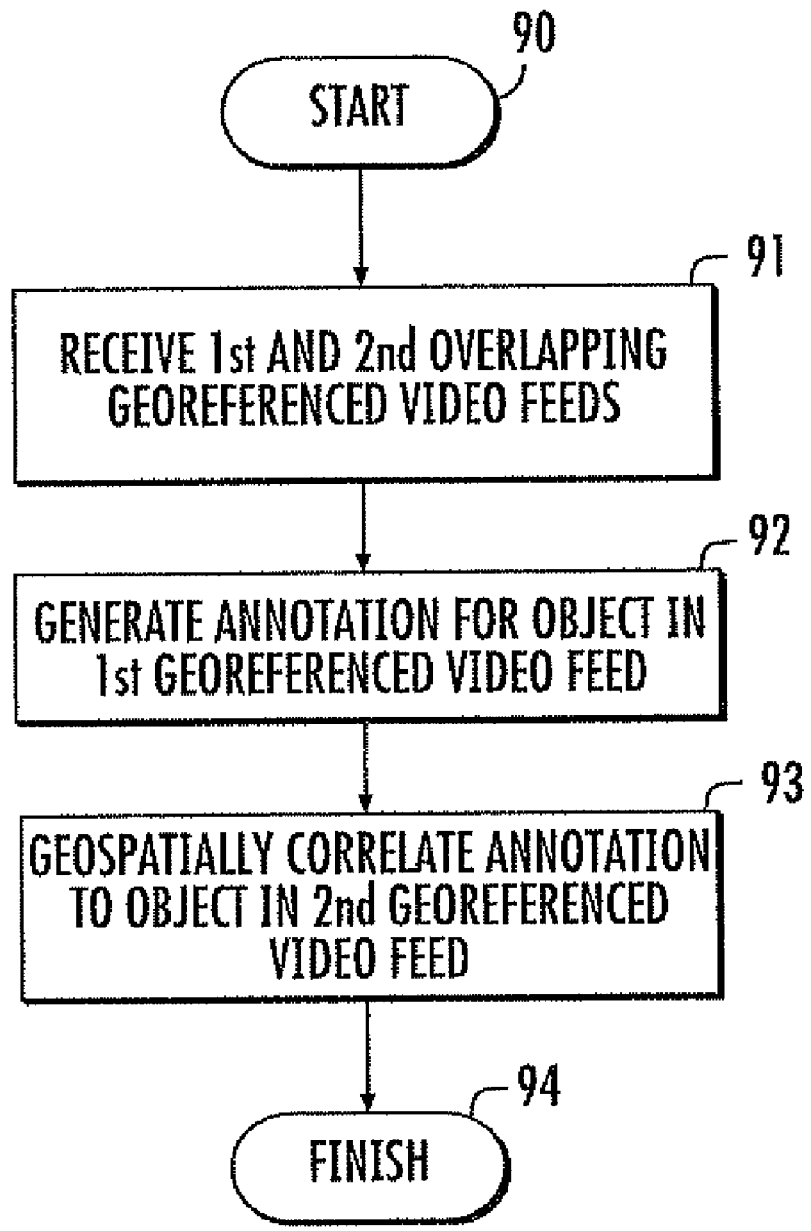
FIGS. 9 and 10 are flow diagrams illustrating video processing method aspects associated with the systems of FIGS. 6 and 7.
Figure 10:
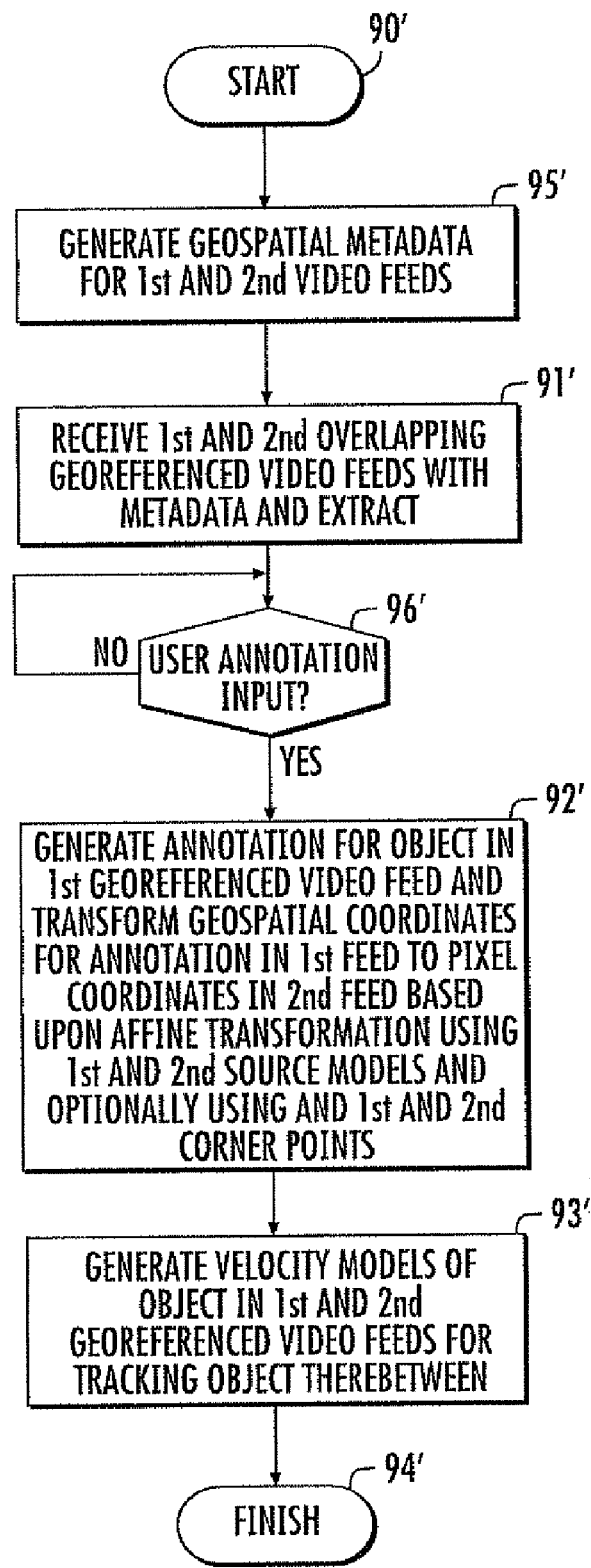
Figure 11:
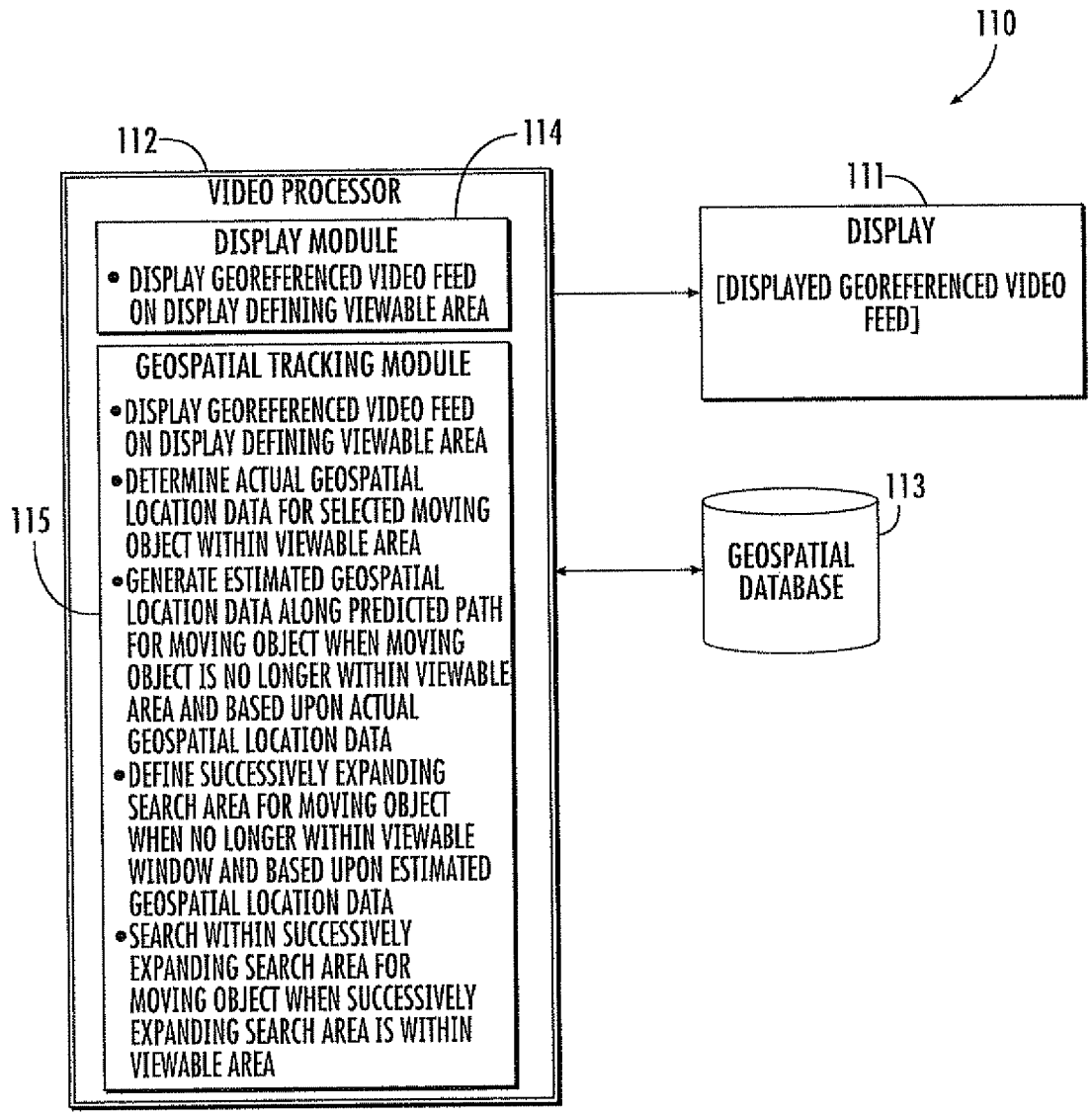
FIG. 11 is a schematic block diagram of a video processing system in accordance with still another aspect of the invention providing a successively expanding search area for moving objects when outside of a viewable area to allow for ready searching for the moving object when it is within the search area.
Figure 12:
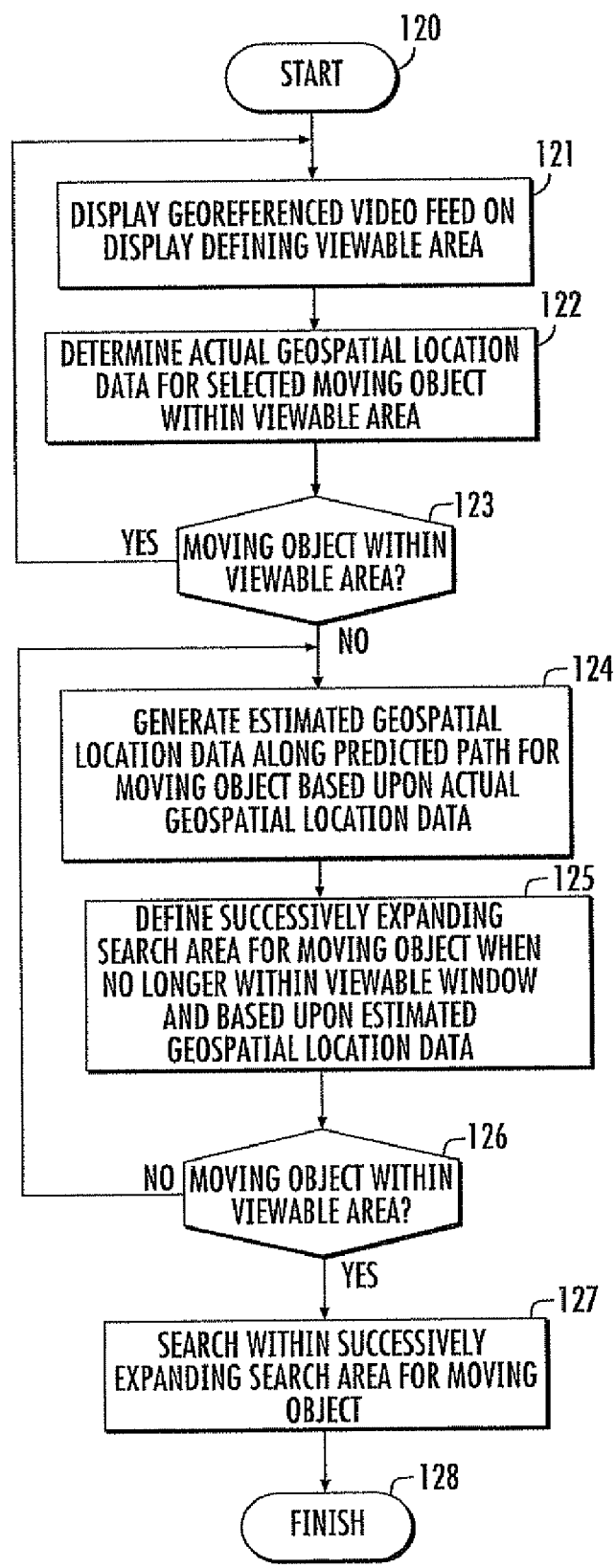
FIGS. 12 and 13 are flow diagrams illustrating method aspects associated with the system of FIG. 11.
Figure 13:
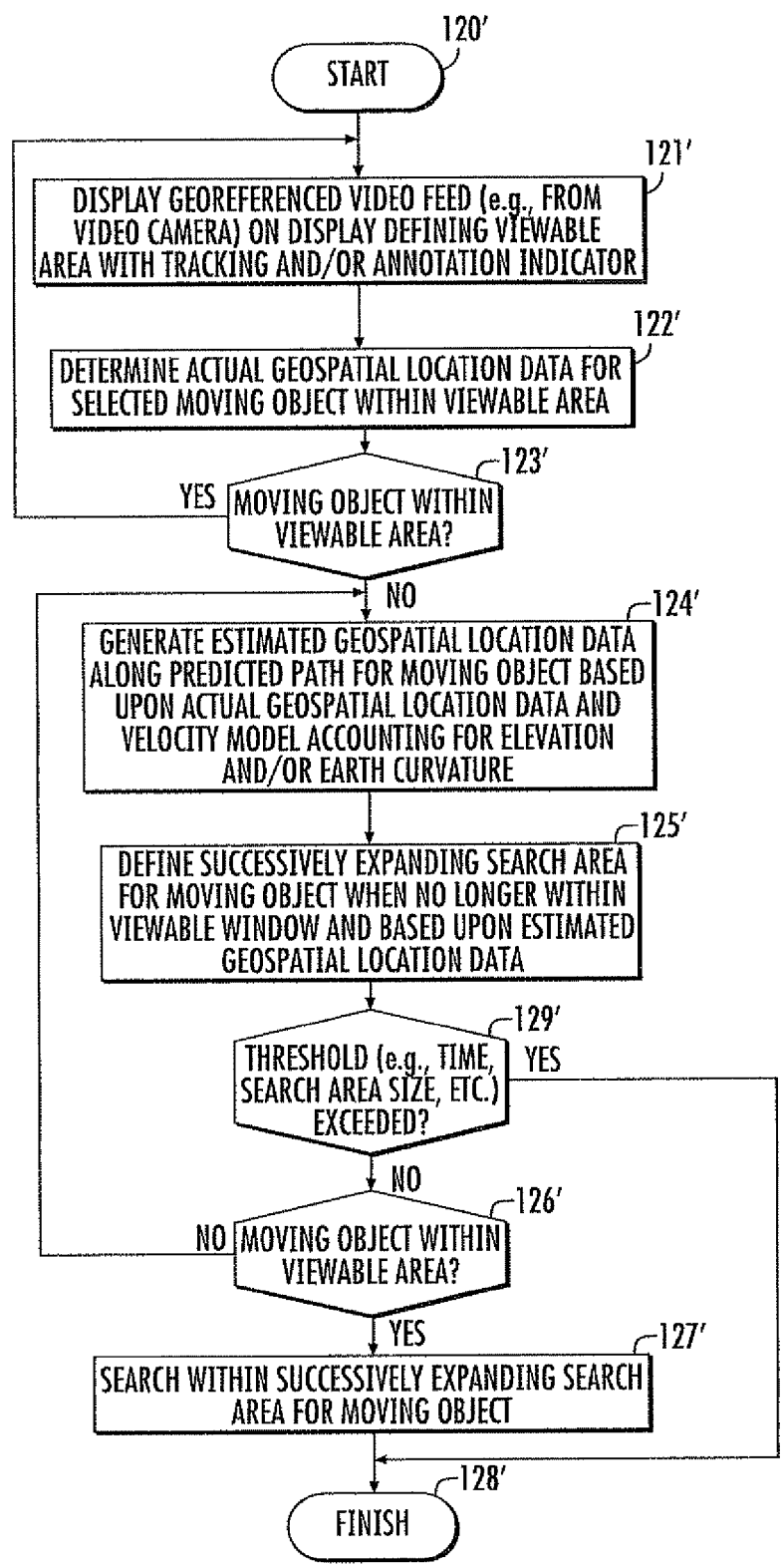

More particularly, one example in which the first and second georeferenced video feeds overlap each another will be further understood with reference to FIGS. 7, 8A, and 8B. In the example of FIG. 7, the first video source includes a first video camera 70' and a first metadata generation module 72', while the second video source includes a second video camera 71' and a second metadata generation module 73'. That is, the cameras 70', 71' generate video imagery based upon their particular vantage point, while the metadata generation modules 72', 73' generate respective metadata for each of the video feeds, at Block 95'. In some embodiments, the metadata generation modules 72', 73' may be incorporated within the cameras 70', 71'. In other embodiments, the cameras 70', 71' may be stationary cameras, etc., without the capability to produce metadata (e.g., traffic cameras), and the metadata generation modules may be inserted downstream to create the necessary metadata and package it together with the video imagery in a media transport format, as will be appreciated by those skilled in the art.

In the illustrated example, the video cameras 70', 71' are directed at a common scene, namely a football player 80 which in FIG. 8A is diving toward the first video camera 70' to make a catch. The video frame of FIG. 8B shows the same player making the catch from a side view a few moments later in time. In the illustrated example, an annotation 81 is input from a telestrator via the annotation module 64' by a user (e.g., a commentator). The annotation reads "keeps his eye on the ball," and it is overlayed on the video feeds as shown. Of course, other suitable input devices for providing annotation input (e.g., computer mouse/keyboard, etc.) may also be used. Various types of visual textual, etc., annotations may be used, as will be appreciated by those skilled in the art.

The video processor 63' illustratively includes a geospatial metadata extraction module 74' for extracting geospatial metadata from the first and second georeferenced video feeds (Block 91'), which may also be stored in a metadata database 75' (e.g., a COTS database). An archival storage device or database 77' may also be included and configured to store the first and second georeferenced video feeds. The archive storage database 77' may also be implemented with a COTS database or other data storage medium.

The geospatial correlation module 65' illustratively includes a coordinate transformation module 76' configured to transform geospatial coordinates for the annotation in the first georeferenced video feed to pixel coordinates in the second georeferenced video feed. Moreover, the first and second video sources may have respective first and second source models associated therewith, and the transformation module may perform affine transformations using the first and second source models.

More particularly, the affine transformations between image and ground space (and vice versa) are performed using sensor models that are unique to each sensor (here the video cameras 70', 71'), according to the following equation:

$$\begin{bmatrix} d_x \\ d_y \\ d_z \end{bmatrix} = \begin{bmatrix} 1 & 0 & 0 \\ 0 & \cos-\theta_x & \sin-\theta_x \\ 0 & -\sin-\theta_x & \cos-\theta_x \end{bmatrix} \begin{bmatrix} \cos-\theta_y & 0 & -\sin-\theta_y \\ 0 & 1 & 0 \\ \sin-\theta_y & 0 & \cos-\theta_y \end{bmatrix}$$

$$\begin{bmatrix} \cos-\theta_z & \sin-\theta_z & 0 \\ -\sin-\theta_z & \cos-\theta_z & 0 \\ 0 & 0 & 1 \end{bmatrix} \left( \begin{bmatrix} a_x \\ a_y \\ a_z \end{bmatrix} - \begin{bmatrix} c_x \\ c_y \\ c_z \end{bmatrix} \right)$$

where a is the ground point, c is the location of the camera, and θ is the rotation of the camera (compounded with platform rotation). As will be appreciated by those skilled in the art, accuracy may be increased by using an elevation surface, rather than a spheriodal/ellipsoidal reference surface, in some embodiments, if desired.

In instances where real-time processing is desired, or the spatial metadata is not sufficient to construct a desired sensor model, other methods (such as interpolation of corner points) may also be used (Block 92'), but potentially with reduced accuracy, as will also be appreciated by those skilled in the art. By way of example, the data below is an excerpt from a standard set of Scan Eagle metadata that can be used to specify the transformation to and from ground space:

```
<Slant_Range>1228.2802734375</Slant_Range>
<Sensor_Roll_Angle>6.440000057220459</Sensor_Roll_Angle>
<Sensor_Pointing_Azimuth>242.3699951171875</Sensor_Pointing_Azimuth>
<Sensor_Elevation_Angle>243.3899993896484</Sensor_Elevation_Angle>
<Aircraft_roll_angle>11.06999969482422</Aircraft_roll_angle>
<Aircraft_pitch_angle>-0.09000000357627869</Aircraft_pitch_angle>
<Aircraft_heading_angle>82</Aircraft_heading_angle>
<Field_of_View>8.010000228881836</Field_of_View>
<Sensor_Altitude>1830.019165039063</Sensor_Altitude>
<Sensor_Latitude>35.51555555555556</Sensor_Latitude>
<Sensor_Longitude>-117.2654444444444</Sensor_Longitude>
```

Furthermore, the geospatial correlation module 65' may further include a velocity model module 78' configured to generate velocity models of the object (i.e., the football player 80 in FIGS. 8A and 8B) in the first and second georeferenced video feeds for tracking the object therebetween, at Block 93'. Velocity models are computed to provide accurate interpolation between sensors with differing collect intervals. Pixel-based tracking may be used to reacquire the object of interest and continue tracking between the various video feeds so that the annotation may continue to follow the tracked object as the video progresses. Exemplary velocity models and tracking operations will be discussed further below. The system 60' further illustratively includes one or more displays 79' coupled to the video processor 63' for displaying one both of the video feeds with the overlayed annotation(s).

The systems 60, 60' thus advantageously provide for "chaining" visual sensors to track annotated objects across wide areas for real-time or forensic purposes. Moreover, this may also reduce user workload necessary to mark up multiple sources, as well as improving user situational awareness. This approach may also be used to automatically enhance metadata repositories (since metadata generated for one feed may automatically be translated over to other overlapping feeds), and it has application across multiple media source types including video, motion imagery, and still imagery.

Turning additionally to FIGS. 11-14D, another exemplary video processing system 110 and associated method aspects are now described. By way of background, maintaining situational awareness over a large area using georeferenced video may be difficult. Current tracking technologies may be of some help in certain applications, but such trackers are usually limited to tracking objects within a viewable frame area and which are not occluded. Since video has become an important tool for decision making in tactical, disaster recovery, and other situations, tools to enhance the effectiveness of video as an informative data source are desirable. Generally speaking, the system 110 maintains an up-to-date geospatial location for tracked objects and generates a movement model for that object. Using the movement model and the latest (i.e., last known) geospatial coordinates of the object, the object's location may be predicted even if primary tracking is lost due to the object no longer being within the viewable frame area, occlusion, etc. As such, the system 110 may be particularly advantageous for civil programs (e.g., police, search and rescue, etc.), and various video applications such as telestration tools, collaborative video tools, etc., as will be appreciated by those skilled in the art.

Figure 14A:
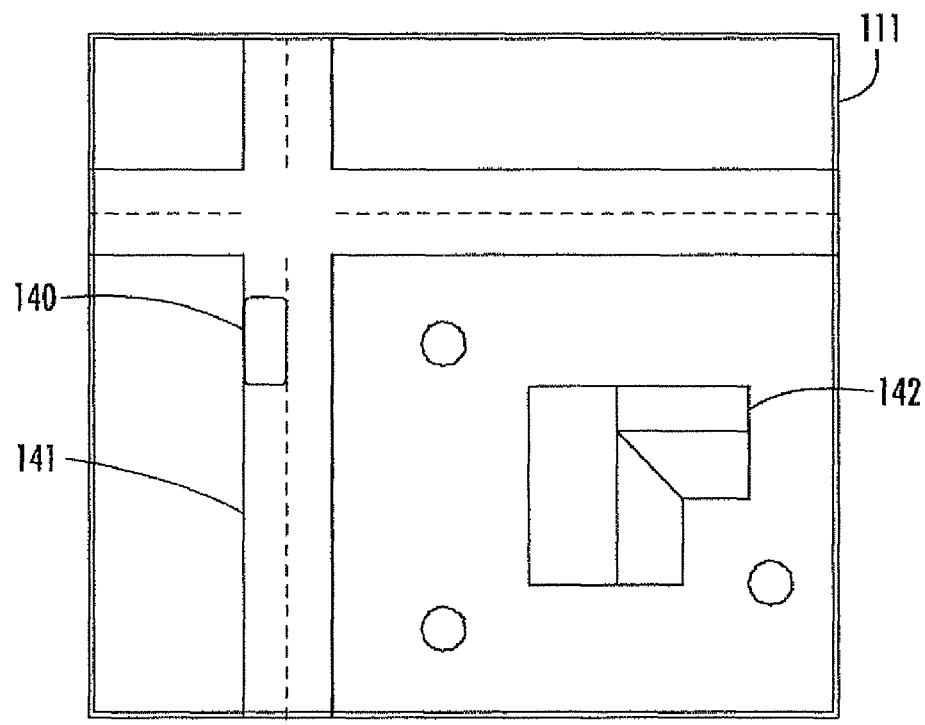
FIGS. 14A-14D are a series of display views illustrating the use of a successively expanding search area by the video processing system of FIG. 11.

More particularly, the video processing system 110 illustratively includes a display 111 and a video processor 112 coupled to the display. Beginning at Block 120, the video processor 112 illustratively includes a display module 114 configured to display a georeferenced video feed on the display defining a viewable area, at Block 121. The video processor 112 further illustratively includes a geospatial tracking module 115 configured to determine actual geospatial location data for a selected moving object 140 within the viewable area, at Block 122, which in the example shown in FIG. 14A is a vehicle traveling along a road 141. The modules 114, 115 may be implemented with an existing video processing platform that performs pixel tracking, such as the above-noted FAME™ system, for example. Moreover, a tracking indicator and/or annotation may also be displayed along with the object being tracked, as discussed above with reference to FIG. 3, for example (Block 121').

Figure 14B:
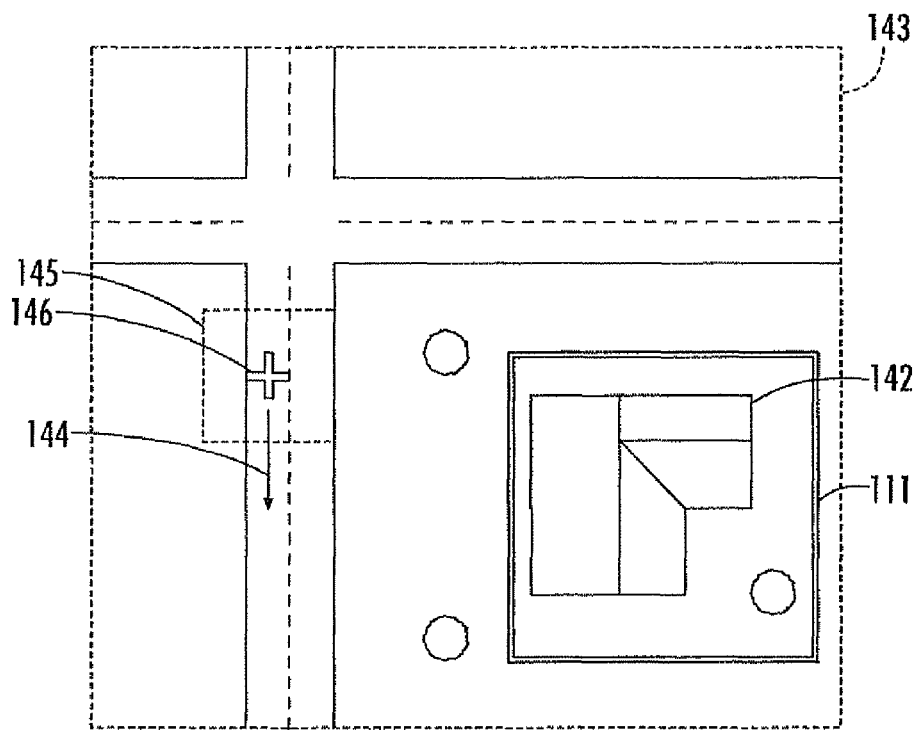

The module 115 is further configured to generate estimated geospatial location data along a predicted path for the moving object 140 when the moving object is no longer within the viewable area and based upon the actual geospatial location data, at Blocks 123-124, and as seen in FIG. 14B. The predicted path is visually represented by an arrow 144. The moving object 140 (which is not shown in FIGS. 14B and 14C to illustrate that it is outside the viewable area) may cease to be within the viewable area for a variety of reasons. As noted above, the object may go behind or underneath a structure (e.g., building, tunnel, etc.), which occludes the moving object 140 from view by the sensor. Another reason is that the object moves outside of the viewable area. Still another reason is that the zoom ratio of the image sensor capturing the video feed may be changed so that the moving object 140 is no longer within the viewable area, which is the case illustrated in FIGS. 14A-14D.

More particularly, in FIG. 14B the viewable area that can be seen on the display 111 is zoomed in to focus on a house 142. In other words, the moving object 140 and road 141 would no longer be viewable to the user on the display 111, although the imagery included within the original viewable area 143 from FIG. 14A is still shown in FIG. 14B for reference. When the moving object 140 is no longer within the viewable window, the video processor 112 defines a successively expanding search area 145 for the moving object 140 based upon the estimated geospatial location data (i.e., the last known geospatial position of the object before it was lost from the viewable area), at Block 125. The viewable area is defined by a first set of boundary pixels in pixel space (e.g., the corner points of the viewable area), and the video processor 112 may be further configured to define the successively expanding search area by a second set of boundary pixels (e.g., a second set of corner pixel points), for example, in the case of a rectangular boundary area. Other boundary area shapes may also be used, if desired (e.g., circular, etc.).

Figure 14C:
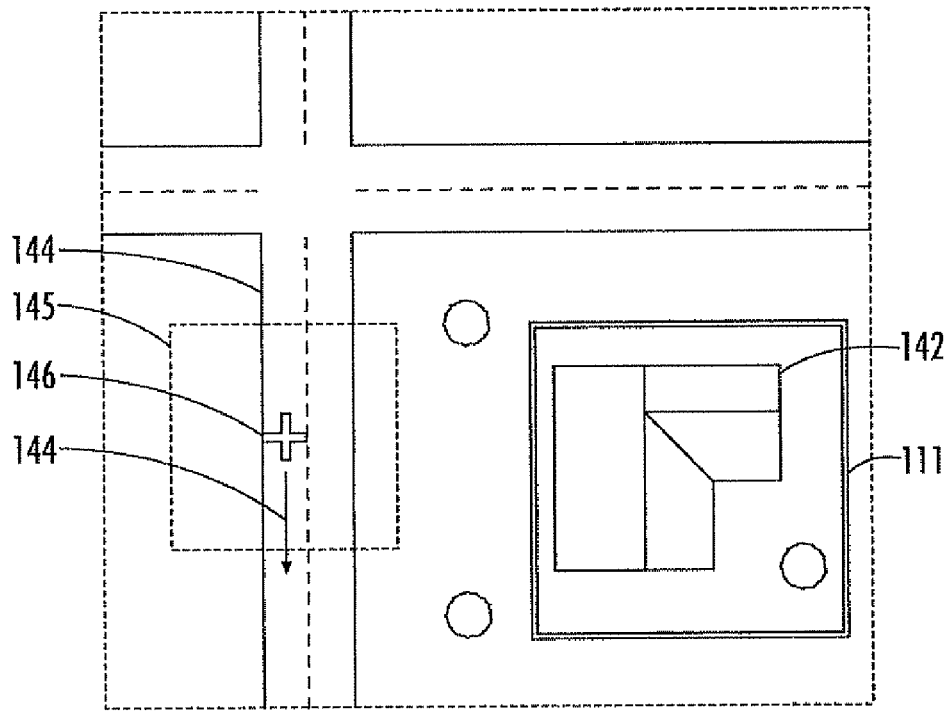
Figure 14D:
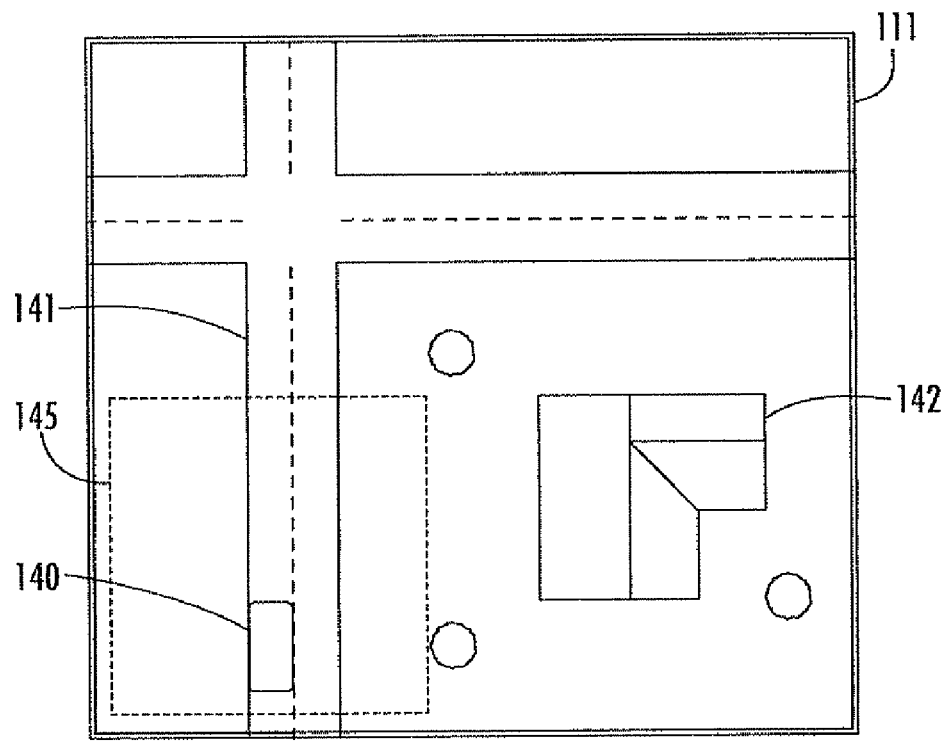
Figure 15:
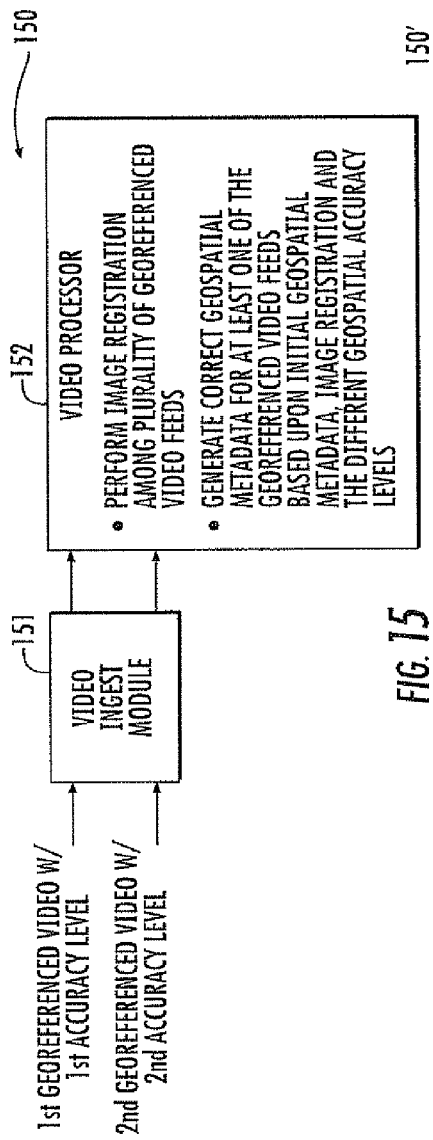
FIG. 15 is a schematic block diagram of a video processing system in accordance with yet another aspect of the invention providing correction of geospatial metadata among a plurality of georeferenced video feeds.
Figure 16:
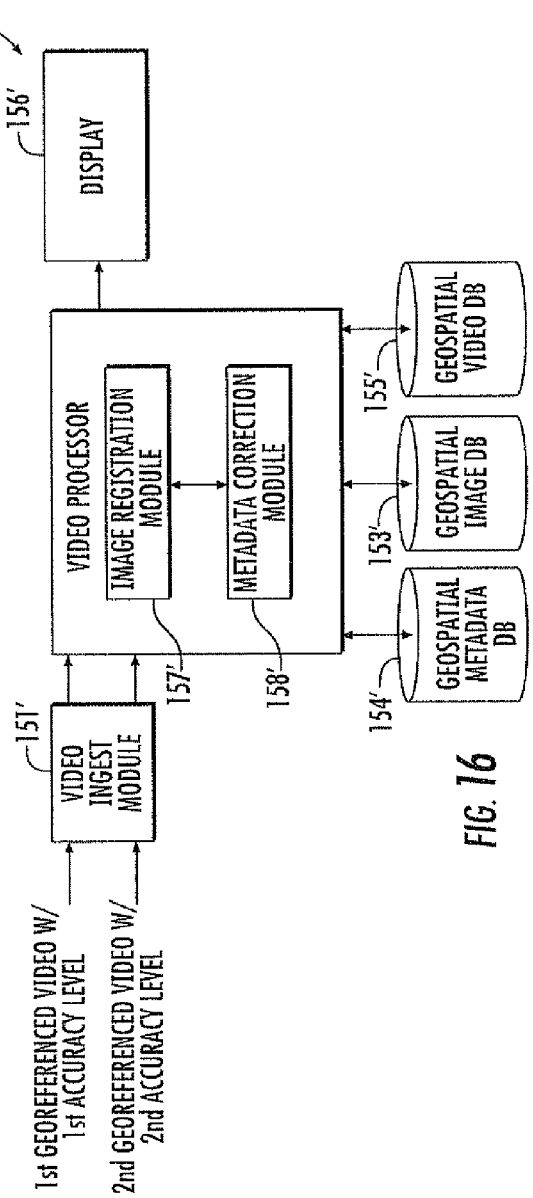
FIG. 16 is a schematic block diagram of an alternative embodiment of the video processing system of FIG. 15.
Figure 17:
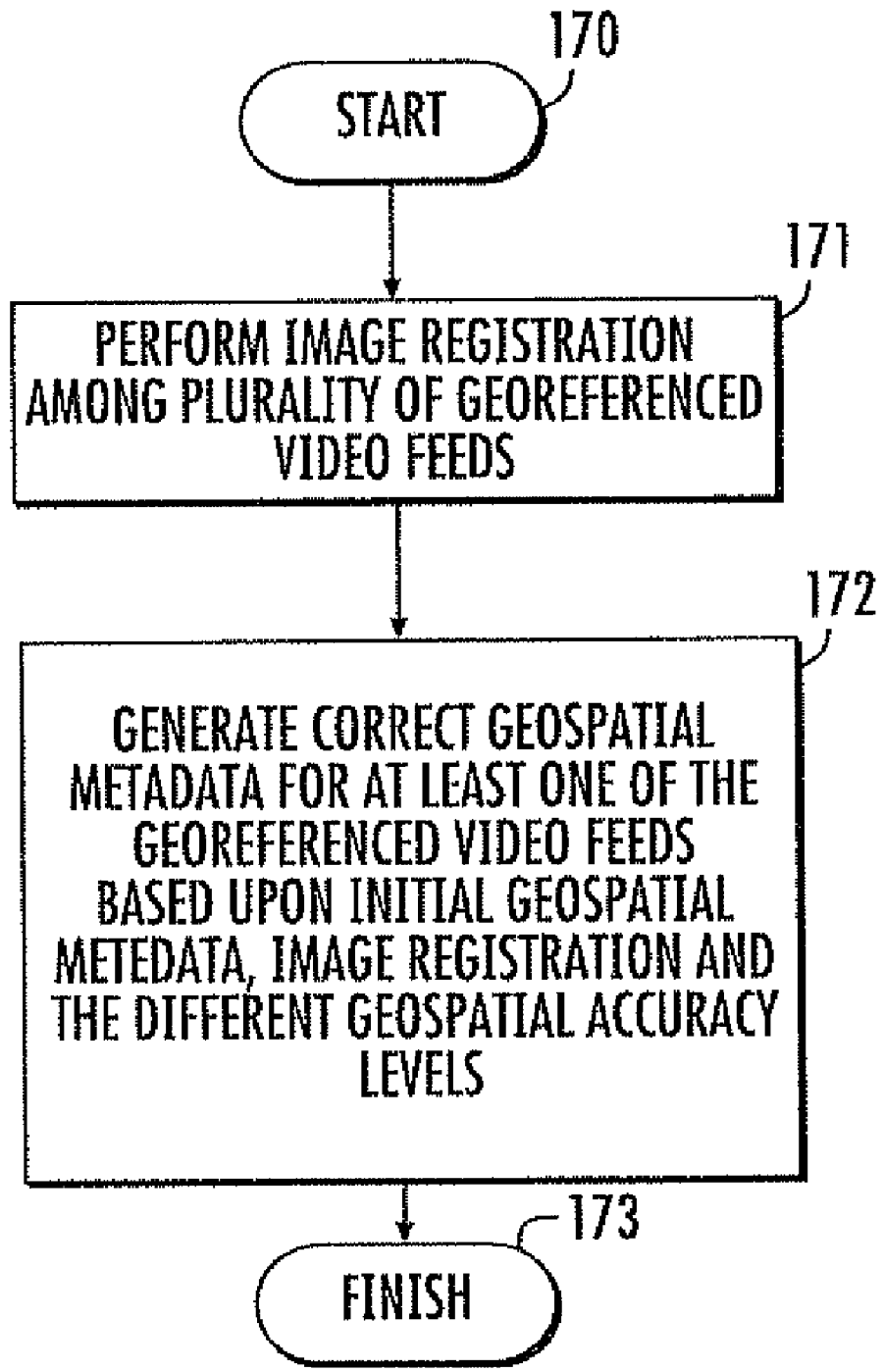
FIGS. 17 and 18 are flow diagrams illustrating method aspects associated with the system of FIGS. 15 and 16.
Figure 18:
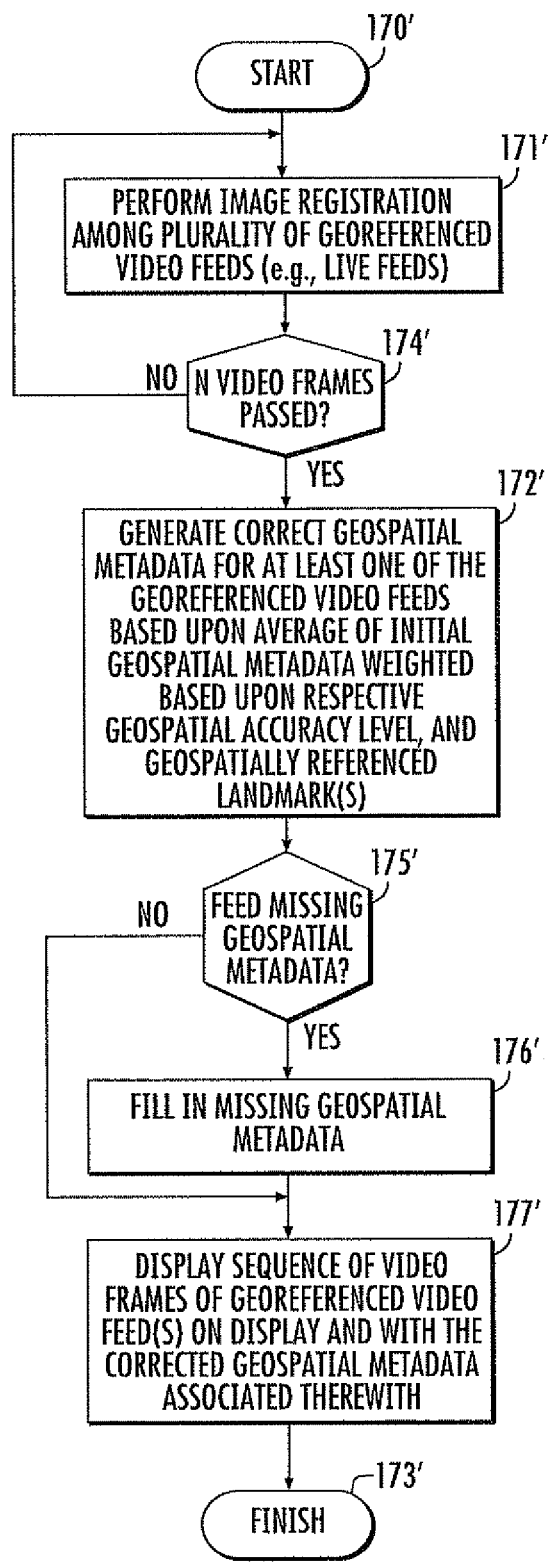

As can be seen in the sequence of FIGS. 14B through 14D, the search area 145 continues to expand while the moving object 140 is outside of the viewable area. This is because the longer the object 140 is outside the viewable area, the more the confidence level as to the object's estimated position 146 will decrease. That is, the velocity of the object 140 may change from the last known velocity, which would result in the object being nearer or father away from an estimated location 146 based solely on its last known velocity. Thus, the search area 145 may advantageously expand to accommodate a range of increasing and decreasing velocities as time progresses.

To improve accuracy, in some instances knowledge of the moving object's last position may be used in refining the velocity model. For example, if the object 140 was at an intersection and had just begun moving when it was lost from the viewable area, knowledge of the speed limit would allow the video processor 112 to refine the velocity model to account for acceleration up to the speed limit, and use the speed limit as the estimated rate of travel from that point forward. Another way in which the expandable search area 145 could be adjusted to account for the particular area where the object is would be if the projected path of the object takes it to an intersection, where the object could potentially change its direction of travel. In such case, the rate of expansion of the search area 145 could be increased to account for the potential change in direction, as well as continued travel along the predicted path. Other similar refinements to the rate of expansion of the search area 145 may also be used, as will be appreciated by those skilled in the art.

In the present example, the moving object 140 is once again within the viewable area in FIG. 14D. Here, this occurs because the operator has zoomed out to the original viewable area shown in FIG. 14A. With typical pixel tracking systems, it would be difficult to automatically re-acquire the moving object 140 without user intervention because the pixel tracker would not know where to begin looking for the object. However, by generating and expanding the search area 145 over the time that the moving object is outside of the viewable area, the video processor 112 now has a relatively well-defined area in which to search (e.g., though pixel tracking operations) to find the moving object 140 when it is once again within the viewable area, at Blocks 126-127, thus concluding the method illustrated in FIG. 12 (Block 128).

This significantly increases the probability that the object 140 can be located and tracking resumed. Thus, the video processor 112 may relatively quickly re-acquire the moving object 140 after it exits and re-enters the viewable area, after panning away from and back to the object, etc., to thereby provide enhanced tracking and/or monitoring of objects within georeferenced video feeds. Yet, even if the moving object 140 is not recovered once it is again within the viewable area, it's last know location and predicted path are potentially important pieces of information. The system 112 may optionally include one or more geospatial databases 113, which provides the ability to maintain or store known locations of important objects. This may advantageously allow tracking of targets to be resumed by other UAVs or video sensors, even though the object can no longer be tracked by the current sensor.

One exemplary velocity modeling approach is now described. The moving object 140 location in pixel space may be converted to geospatial coordinates, from which the velocity model is generated. The velocity model may take a variety of forms. One straightforward approach is to calculate the velocity of the object 140 as a ratio of distance traveled to time between measurements as follows:

$$v_{obj}(t) = \frac{\Delta_{pos}}{\Delta t},$$

where $\Delta_{pos}$ is the change in position, and t is time. An average may then be used to estimate future velocity as follows:

$$v_{obj}(t+1) = \frac{\sum_{t=-n}^{0} (v_{obj}(t))}{n},$$

where n is the number of measurements over which the velocity is averaged. More sophisticated alternatives of the velocity model may account for elevation, earth curvature, etc., (Block 124') to further improve accuracy where desired. Accounting for earth curvature or elevation may be particularly helpful when tracking objects over relatively long distances/measurement intervals, for example.

At a certain point, it may become appropriate for the video processor 112 to discontinue generating the estimated geospatial location data. For example, if the expandable search area 145 exceeds a threshold, such as a size threshold, or a threshold time for position estimation, at Block 129', then the search area may have expanded to the point that it is no longer beneficial for re-acquiring the object 140 for tracking. That is, the search area may have become so large that there is no practical benefit to continuing expansion of the search area 145, and the processing/memory overhead requirements associated therewith. The length or size of such thresholds may vary based upon the particular implementation, and could be changed from one implementation or application to the next. Factors that may affect the duration or size of the threshold include the nature of the objects being tracked, their ability to change directions (e.g., complexity of road system), expected velocities of the objects in a given environment, etc., as will be appreciated by those skilled in the art. For example, it may be desirable to track a vehicle traveling along a long, straight dirt road where the top speed may be relatively slow, as opposed to a vehicle in a metropolitan area where there is ready access to high-speed interstates that go in many different directions.

Referring additionally to FIGS. 15 through 19, another exemplary video processing system 150 and associated method aspects are now described. In applications such as aerial surveillance, targeting, and research systems, for example, geospatial metadata sent from UAVs or other aerial platforms is often not precise enough for position sensitive activities or determinations. Generally speaking, the system 150 advantageously provides an approach for automatically correcting inaccuracies in geospatial metadata across multiple video feeds due to misaligned frames in the video or through a lack of coordinate precision, for example.

More particularly, the video processing system 150 illustratively includes one or more video ingest modules 151 for receiving a plurality of georeferenced video feeds each comprising a sequence of video frames and initial geospatial metadata associated therewith. Moreover, each georeferenced video feed has a respective different geospatial accuracy level associated therewith. In the illustrated example, there are two georeferenced video feeds, but other numbers of feeds may be used in some embodiments as well.

The system 150 further illustratively includes a video processor 152 coupled to the video ingest module 151 that is configured to perform image registration among the plurality of georeferenced video feeds, at Block 171. Moreover, the video processor 152 further generates correct geospatial metadata for at least one of the georeferenced video feeds based upon the initial geospatial metadata, the image registration and the different geospatial accuracy levels, at Block 172, thus concluding the method illustrated in FIG. 17.

The system 150 may thereby provide automatic real-time metadata correction that may use geospatial metadata to find a general area of reference between two or more sensor feeds (UAVs, stationary camera, etc.), and use a predefined accuracy metric to determine which feed is more accurate. For example, some sensor feeds that produce full motion video (30 fps) are less accurate than high definition surveillance feeds (<15 fps) that are captured at a higher altitude. The video processor 152 may perform image registration not only against reference images, which may be stored in a geospatial image database 153', but also may perform image registration between the overlapping portions of different video frames.

More particularly, as the video feeds are being ingested, their respective geospatial metadata is used by the video processor 152 to find a common region of interest 191 between the feeds, typically corresponding to a landmark. In some applications, the reference geospatial images in the database 153' may be used as well. The video image frames (and, optionally, images from the database 153') are used to perform the image registration around the common region of interest 191.

Figure 19:
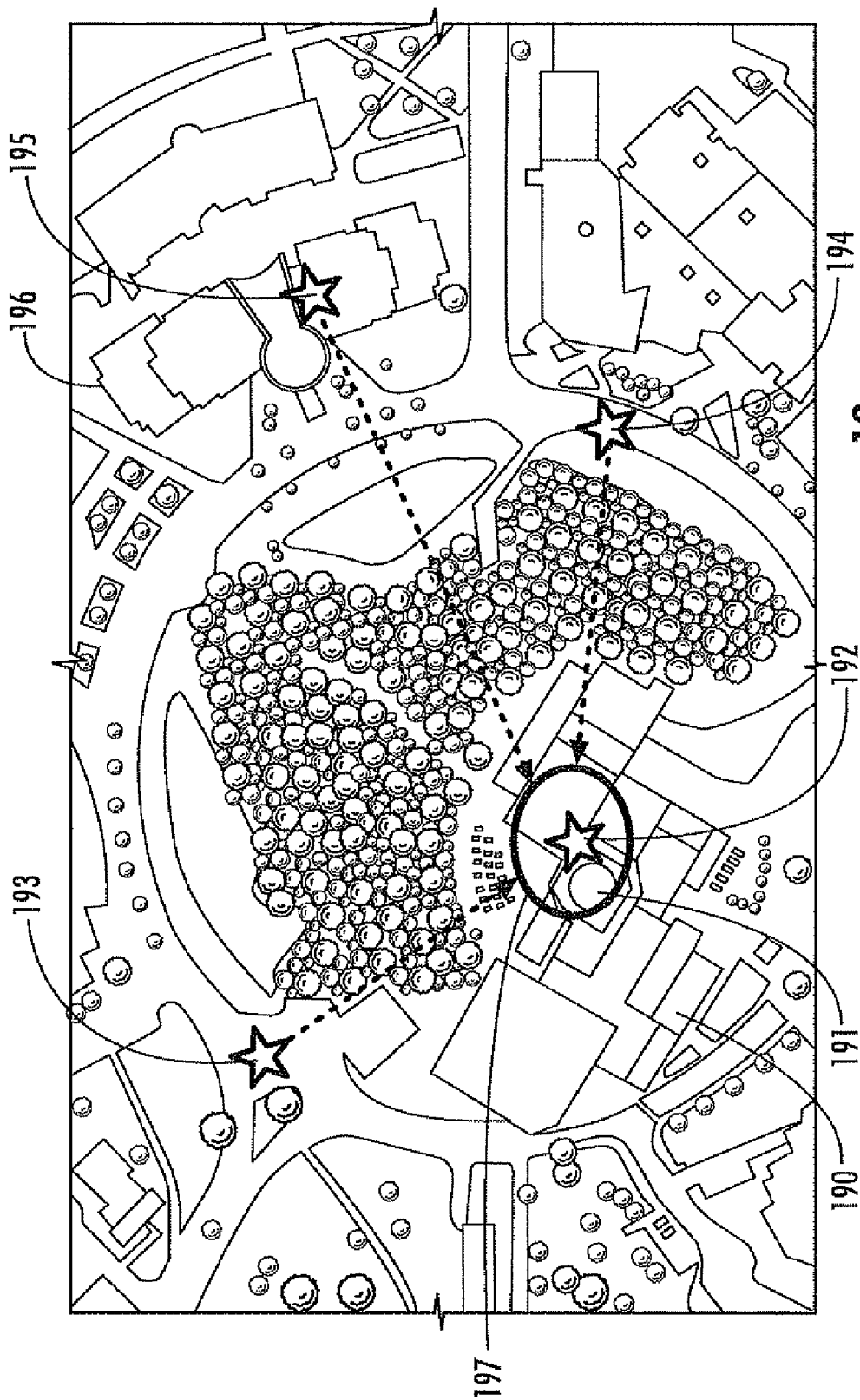
FIG. 19 is a view of the display of the system of FIG. 15 illustrating geospatial metadata correction operations performed by the systems of FIGS. 15 and 16.

In the example of FIG. 19, four different aerial sensors are used to generate a georeferenced video feed for the area surrounding a building 190, and the particular area of interest 197 corresponds to a specific landmark on the building, namely a dome 191. The coordinates for the dome 191 resulting from the first video feed result in a point 192 (represented with a star) within a few meters of the dome, which is therefore the most accurate of the video feeds. Points 193 and 194 are from the second and third video sensors, respectively, and are farther away from the dome 191. The fourth sensor video feed is the least accurate, and provides a geospatial coordinate set for the dome 191 that is approximately two hundred meters away and in the middle of a completely different building 196 due to a floating point imprecision associated with the fourth sensor.

Accuracy metrics for the various sensor types are typically known or may be measured prior to video capture, as will be appreciated by those skilled in the art. Once the image registration has been performed, with the benefit of the accuracy metrics the video processor 152 may automatically correct the geospatial metadata for video frames in one or more of the video feeds using a metadata correction algorithm. Depending upon the given implementation, the correction algorithm may be relatively straightforward, or more complex, depending upon the desired speed and accuracy required. By way of example, for real-time applications, faster and slightly less accurate algorithms may be used. One straightforward approach is to correct the metadata for the less accurate sensor with that of the most accurate sensor (i.e., based upon their respective accuracy metrics). Thus, using this straightforward algorithm, the video processor 152 would determine which video feed from the provided video feeds is from the sensor with the greatest accuracy, and it would perform the correction based upon the metadata therefrom.

A somewhat more sophisticated approach is to use the predefined accuracy ratings to rank each sensor feed. This approach uses a weighted average of the metadata from all of the feeds to determine the new or corrected geospatial metadata based on the their respective accuracy rankings, at Block 172'. One exemplary algorithm for performing the weighted average is as follows:

$$G = \left( \frac{\sum_{i=1}^{N} \left(\frac{R_i}{T}\right)_i O_i}{\sum_{i=1}^{N} \left(\frac{R_i}{T}\right)_i} \right)$$

where G=new corrected geospatial metadata, N=number of sensors, where R=sensor ranking, T=total rankings, and O=old geospatial metadata.

The video processing system 150' also illustratively includes geospatial metadata database 154' coupled to the video processor 152' for storing the corrected geospatial metadata. A geospatial video database or storage device 155' is coupled to the video processor 152' and is for storing the sequence of video images for each video feed. In some embodiments, some or all of the data may be combined into a common database, for example.

The system 150' further illustratively includes a display 156' coupled to the video processor 152', which is configured to display the sequence of video frames of one or more of the georeferenced video feeds on the display and with the corrected geospatial metadata associated therewith, at Block 177'. Thus, for example, when the video feed for the fourth sensor noted above is displayed, rather than providing a geospatial location that is approximately two hundred meters off when the user selects the dome 191, the user would instead be provided with the corrected geospatial coordinates.

Again depending upon the speed and accuracy level required, the video processor 152' may perform the correction operations on an interval basis, rather than on every frame. That is, the video processor 152' may generate the corrected geospatial metadata every N number of video frames, where N is greater than 1. In addition to correcting inaccurate geospatial data for a given video feed, in some instances the video feed may have missing geospatial metadata due to errors, etc. In such case, the video processor 152' may be further configured to fill in the missing geospatial metadata using the same approach outlined above, i.e., based upon the initial geospatial metadata, the image registration and the different geospatial accuracy levels, at Blocks 175'-176'.

The above-described approach may advantageously be implemented on a platform independent basis. As such, with little or no operator intervention, the geospatial information in the video frames may be automatically corrected to produce a more accurate georeferenced video than relying on raw sensor video alone. Moreover, the system 150 also advantageously provides ingest and metadata correction abilities for new video streams where reference imagery is not otherwise available, but other, more accurate aerial sensor video feeds are. Further, the corrected metadata and video feed may be respectively stored in the geospatial metadata database 154' and geospatial video database 155' to provide the video analyst with accurate georeferenced video to perform future metadata correction (i.e., from archived video feeds), as opposed to real-time or live video feeds.

The systems 150, 152' therefor advantageously may save users time and money by automatically correcting frames in a video feed(s) video which would otherwise have inaccurate geospatial information. These systems may advantageously be used in a variety of applications for government and civilian sectors where relatively accurate georeferenced video streams are required, such as targeting systems, surveillance systems, and aerial mapping, for example.

The above-described systems may be implemented in various video processing platforms, such as the above-described FAME™ system, for example. It should also be noted that the some or all of the aspects of the systems and methods, which were described separately above for clarity of illustration, may also be combined in a single system or method, as will be readily appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A video processing system comprising:
a display; and
a video processor coupled to said display and configured to
  display a georeferenced video feed on said display defining a viewable area,
  determine actual geospatial location data for a selected moving object within the viewable area,
  generate estimated geospatial location data along a predicted path for the moving object when the moving object is no longer within the viewable area and based upon the actual geospatial location data,
  define a successively expanding search area for the moving object when the moving object is no longer within the viewable area and based upon the estimated geospatial location data,
  search within the successively expanding search area for the moving object when the successively expanding search area is within the viewable area, and
  discontinue generating the estimated geospatial location data based upon a threshold.

2. The video processing system of claim 1 wherein said video processor is further configured to overlay an annotation indicator for the moving object within the viewable area.

3. The video processing system of claim 1 further comprising a geospatial database for storing the actual geospatial location data.

4. The video processing system of claim 1 wherein the viewable area is defined by a first set of boundary pixels; and wherein said video processor is further configured to define the successively expanding search area by a second set of boundary pixels.

5. The video processing system of claim 1 wherein said video processor is configured to generate the estimated geolocation data further based upon a velocity model.

6. The video processing system of claim 5 wherein the velocity model accounts for elevation.

7. The video processing system of claim 5 wherein the velocity model accounts for earth curvature.

8. The video processing system of claim 1 wherein the video feed is from a video camera.

9. A video processing system comprising:
a display; and
a video processor coupled to said display and configured to
- display a georeferenced video feed on said display defining a viewable area,
- determine actual geospatial location data for a selected moving object within the viewable area,
- generate estimated geospatial location data along a predicted path for the moving object when the moving object is no longer within the viewable area and based upon the actual geospatial location data,
- overlay a tracking indicator for the moving object within the viewable area,
- define a successively expanding search area for the moving object when the moving object is no longer within the viewable area and based upon the estimated geospatial location data,
- search within the successively expanding search area for the moving object when the successively expanding search area is within the viewable area, and
- discontinue generating the estimated geospatial location data based upon a threshold.

10. The video processing system of claim 9 wherein said video processor is further configured to overlay an annotation indicator for the moving object within the viewable area.

11. The video processing system of claim 9 wherein said video processor is configured to generate the estimated geolocation data further based upon a velocity model.

12. A video processing device comprising:
a memory and a processor cooperating with said memory and configured to
- display a georeferenced video feed on a display and defining a viewable area,
- determine actual geospatial location data for a selected moving object within the viewable area,
- generate estimated geospatial location data along a predicted path for the moving object when the moving object is no longer within the viewable area and based upon the actual geospatial location data,
- define a successively expanding search area for the moving object when the moving object is no longer within the viewable area and based upon the estimated geospatial location data,
- search within the successively expanding search area for the moving object when the successively expanding search area is within the viewable area, and
- discontinue generating the estimated geospatial location data based upon a threshold.

13. The video processing device of claim 12 wherein said geospatial tracking module is further configured to overlay at least one of a tracking indicator and an annotation indicator for the moving object within the viewable area.

14. A video processing method comprising:
- displaying a georeferenced video feed on a display defining a viewable area;
- determining actual geospatial location data for a selected moving object within the viewable area;
- generating estimated geospatial location data along a predicted path for the moving object when the moving object is no longer within the viewable area and based upon the actual geospatial location data;
- defining a successively expanding search area for the moving object when the moving object is no longer within the viewable area and based upon the estimated geospatial location data;
- searching within the successively expanding search area for the moving object when the successively expanding search area is within the viewable area; and
- discontinuing generating the estimated geospatial location data based upon a threshold.

15. The method of claim 14 further comprising overlaying at least one of a tracking indicator and an annotation for the moving object within the viewable area.

16. The method of claim 14 wherein the viewable area is defined by a first set of boundary pixels; and wherein defining the successively expanding search area comprises defining the successively expanding search area based upon a second set of boundary pixels.

17. The method of claim 14 wherein generating comprises generating the estimated geolocation data further based upon a velocity model.

* * * * *